United States Patent
Saito et al.

(10) Patent No.: US 11,394,885 B2
(45) Date of Patent: Jul. 19, 2022

(54) IMAGE DISPLAY SYSTEM AND IMAGE DISPLAY METHOD

(71) Applicant: HITACHI KOKUSAI ELECTRIC INC., Tokyo (JP)

(72) Inventors: Ryuichi Saito, Tokyo (JP); Yohei Yamamoto, Tokyo (JP); Takahiro Funahashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 307 days.

(21) Appl. No.: 16/634,783

(22) PCT Filed: Jul. 31, 2017

(86) PCT No.: PCT/JP2017/027774
§ 371 (c)(1),
(2) Date: Jan. 28, 2020

(87) PCT Pub. No.: WO2019/026159
PCT Pub. Date: Feb. 7, 2019

(65) Prior Publication Data
US 2020/0213519 A1 Jul. 2, 2020

(51) Int. Cl.
*H04N 5/232* (2006.01)
*H04N 7/18* (2006.01)
*B61L 25/04* (2006.01)

(52) U.S. Cl.
CPC .......... *H04N 5/23293* (2013.01); *B61L 25/04* (2013.01); *H04N 7/181* (2013.01); *H04N 7/188* (2013.01)

(58) Field of Classification Search
CPC .... H04N 5/23293; H04N 7/181; H04N 7/188; B61L 25/04; B61L 15/0072; B61L 15/009; B61L 23/04; B61D 19/026; B61K 13/04
See application file for complete search history.

(56) References Cited

U.S. PATENT DOCUMENTS

| | | | |
|---|---|---|---|
| 2013/0002877 A1* | 1/2013 | Miyoshi | B60R 1/00 348/148 |
| 2017/0013237 A1* | 1/2017 | Ito | H04N 5/232933 |

FOREIGN PATENT DOCUMENTS

| | | |
|---|---|---|
| AT | 500925 A1 | 4/2006 |
| EP | 2397386 A1 | 12/2011 |

(Continued)

OTHER PUBLICATIONS

Office action issued in corresponding Japanese patent application No. 2020-109355, dated Apr. 27, 2021.

(Continued)

*Primary Examiner* — Nelson D. Hernández Hernández
(74) *Attorney, Agent, or Firm* — Greer Burns & Crain Ltd.

(57) ABSTRACT

A predetermined image processing is carried out on the images that have been taken by the cameras 101 through 108 attached to a side of the cars that form a train before the images are displayed on the monitor 301 that is mounted in the train. That is to say, as a first image processing, among the images to be displayed, a left-right inversion process is carried out on the images where the positional relationship between the cars and the platform in the image is opposite between left and right to the positional relationship as viewed in the direction in which the train is to travel. In addition, as a second image processing, a cutout process is carried out on the images to be displayed so that the cutout regions differ in accordance with the opening and closing state of the doors.

3 Claims, 10 Drawing Sheets

(56) References Cited

FOREIGN PATENT DOCUMENTS

| | | | |
|---|---|---|---|
| EP | 2547104 A1 | 1/2013 | |
| JP | 5310078 A | 11/1993 | |
| JP | 09226584 A | 9/1997 | |
| JP | 2002125224 A | 4/2002 | |
| JP | 2006033418 A | 2/2006 | |
| JP | 2009190431 A | 8/2009 | |
| JP | 2012001191 A | 1/2012 | |
| JP | 2013067215 A | 4/2013 | |
| JP | 2014148300 A | 8/2014 | |
| WO | 2015145736 A1 | 10/2015 | |
| WO | WO-2015145736 A1 * | 10/2015 | ............... B61D 1/00 |

OTHER PUBLICATIONS

Notice of reasons for refusal issued in corresponding Japanese patent application No. 2019-533763, dated Apr. 17, 2020 (with translation).
ISR issued in Int'l. application No. PCT/JP2017/027774, dated Oct. 10, 2017.
Partial supplementary European Search Report issued in EP patent application No. 17 92 0364.1, dated Feb. 1, 2021; pp. 1-14.
Extended European Search Report issued in EP patent application No. 17 92 0364.1, dated May 17, 2021; pp. 1-14.

* cited by examiner

IMAGE DISPLAY SYSTEM AND IMAGE DISPLAY METHOD

This is a National Phase Application filed under 35 U.S.C. § 371, of International Application No. PCT/JP2017/027774, filed Jul. 31, 2017, the contents of which are incorporated by reference.

TECHNICAL FIELD

The present invention relates to an image display system and an image display method for displaying images taken by cameras attached to the sides of train cars.

BACKGROUND ART

Conventional image display systems for displaying images of a station platform on a monitor have been put into practice so that a train driver or a trainman (hereinafter, these are simply referred to as trainman) can check passengers getting on and off the train. The images to be displayed on the monitor are taken by cameras installed on the main bodies of the train cars or on the platform. In the system that is common in Japan, the images that have been taken by cameras installed on the platform are displayed on the monitor on the platform or on the monitor in the cabin of the train. Meanwhile, in the system that is common in England, for example, the images that have been taken by the cameras attached to the side of the cars are displayed on the monitor in the cabin. This difference is caused by the difference of whether the operation of the train and the infrastructure are managed by the same company or different companies.

In the conventional image display systems, the analog system where no delay occurs is used with priority because the monitoring of the safety of the passengers is required to be in real time. In recent years, however, the progress of IP technologies makes low delay transmission possible, and therefore, all the devices have been connected to an IP network. As one advantage of the IP system, IP technologies make it possible to connect devices with one cable, and thus the cost for the cable can be reduced. In addition, one cable makes it possible to transfer not only image data, but also other types of information such as alarm information and train information. Images that have been taken by a plurality of cameras are encoded in each camera, transmitted to a monitor via an IP network, and decoded in a monitor so as to be displayed.

In the following, an image display system of a car-mounted camera type where cameras are attached to the sides of cars is referred to. For example, Patent Literature 1 discloses a system where cameras are arranged so as to be adjacent to each door of the cars.

CITATION LIST

Patent Literature

Patent Literature 1: WO2015/145736A1

SUMMARY OF THE INVENTION

Technical Problem

The mechanism for displaying the images that have been taken by the cameras on the side of cars as they are on a monitor cannot necessarily be said that images that are easily seen by a trainman can be provided, so that it is possible for the mechanism to burden the trainman with the work for checking the passengers getting on and off the train.

The present invention is provided in view of the above-described conventional states, and an object thereof is to provide a mechanism that can allow a trainman to efficiently check the passengers getting on and off the train.

Solution to Problem

In order to achieve the above-described object, the image display system and the image display method according to the present invention are formed as follows.

(1) An image display system that is mounted in a train formed of a plurality of connected cars, comprising: a camera attached to a side of each car; a monitor for displaying an image that has been taken by the camera; and an image processing unit for processing an image to be displayed on the monitor, characterized in that the image processing unit carries out on an image to be displayed on the monitor a cutout process for selecting a different cutout region in response to the opening or closing state of a door.

(2) The image display system according to the above (1), characterized in that, during a predetermined period immediately after the opening of the door, the image processing unit cuts out a region shifted to the car side.

(3) The image display system according to the above (1), characterized in that, during a period from the elapse of a predetermined period immediately after the opening of the door to the closing of the door, the image processing unit cuts out a region that covers a wider view on the opposite side of the car than the region cut out during the predetermined period immediately after the opening of the door.

(4) The image display system according to the above (1), characterized in that, during a predetermined period immediately after the closing of the door, the image processing unit cuts out a region shifted to the car side where the shifting to the car side is greater than the region cut out during a predetermined period immediately after the opening of the door.

(5) An image display system that is mounted in a train formed of a plurality of connected cars, comprising: a camera attached to the side of each car; a monitor for displaying an image that has been taken by the camera; and an image processing unit for processing an image to be displayed on the monitor, characterized in that, among the images to be displayed on the monitor, the image processing unit carries out a left-right inversion process on the image where the positional relationship between the car and the platform in the image is opposite between the left and the right to the positional relationship as viewed in the direction in which the train is to travel.

(6) The image display system according to the above (5), characterized in that the image processing unit determines the images on which the left-right inversion process is to be carried out on the basis of the information that indicates the direction in which the train is to travel and the information that indicates the direction in which the image is taken by the camera.

(7) The image display system according to the above (5), characterized in that a plurality of cameras is attached to the same side of the same car, and the monitor displays the images taken by the plurality of cameras on the same side of the same car in such a manner that the images are adjacent upwards and downwards or left to right.

(8) An image display method for displaying an image that has been taken by a camera attached to a side of a car that forms a train on a monitor mounted in the train, characterized in that a cutout process for selecting a different cutout region in response to the opening and closing state of a door is carried out on an image to be displayed on the monitor, and the image after the cutout process has been carried out thereon is displayed on the monitor.

(9) An image display method for displaying an image that has been taken by a camera attached to a side of a car that forms a train on a monitor mounted in the train, characterized in that, from among the images to be displayed on the monitor, a left-right inversion process is carried out on the image where the positional relationship between the car and the platform is opposite between the left and the right in the image to the positional relationship as viewed in the direction in which the train is to travel, and the image after the left-right inversion process has been carried out thereon is displayed on the monitor.

Advantageous Effects of the Invention

The image display system and the image display method according to the present invention can allow a trainman to efficiently check passengers getting on and off a train.

DESCRIPTION OF EMBODIMENTS

One embodiment of the present invention is described in reference to the drawings.

Figure 3:
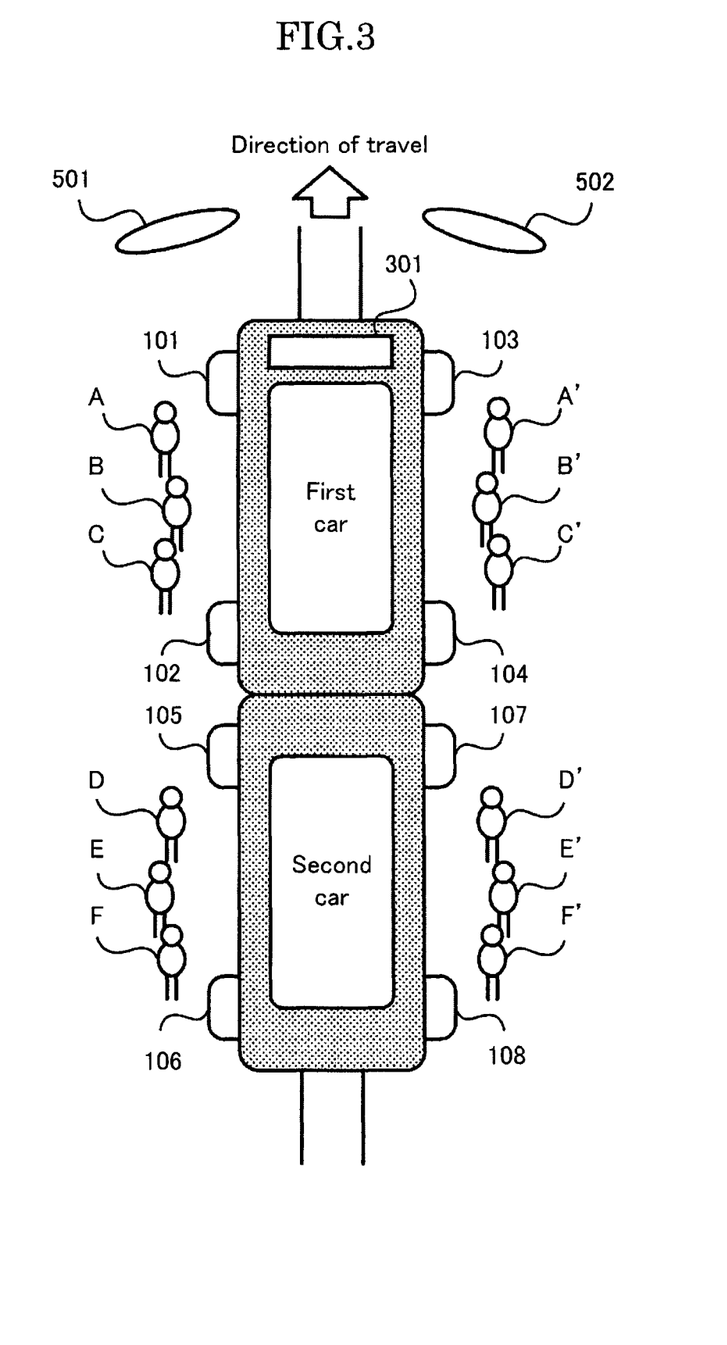
FIG. 3 is a diagram showing an example of a situation where a train is stopped along a platform of a station.
Figure 6:
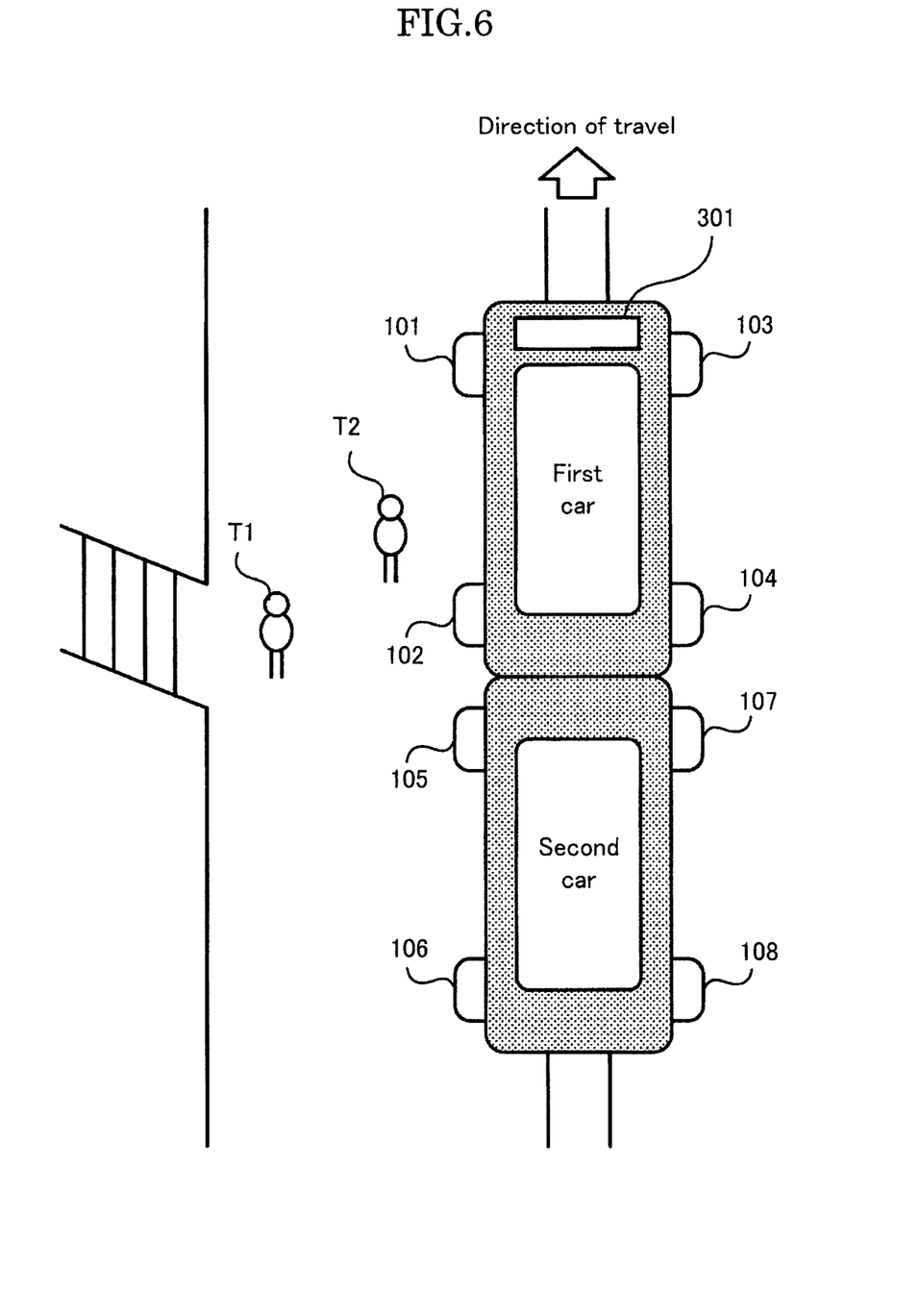
FIG. 6 is a is a diagram showing another example of a situation where a train is stopped along a platform of a station.

In the following, an example of a train formed of two connected cars as shown in FIG. 3 and FIG. 6 is described. Needless to say, however, the number of cars of a train in which the image display system according to the present invention is mounted is arbitrary.

Figure 1:
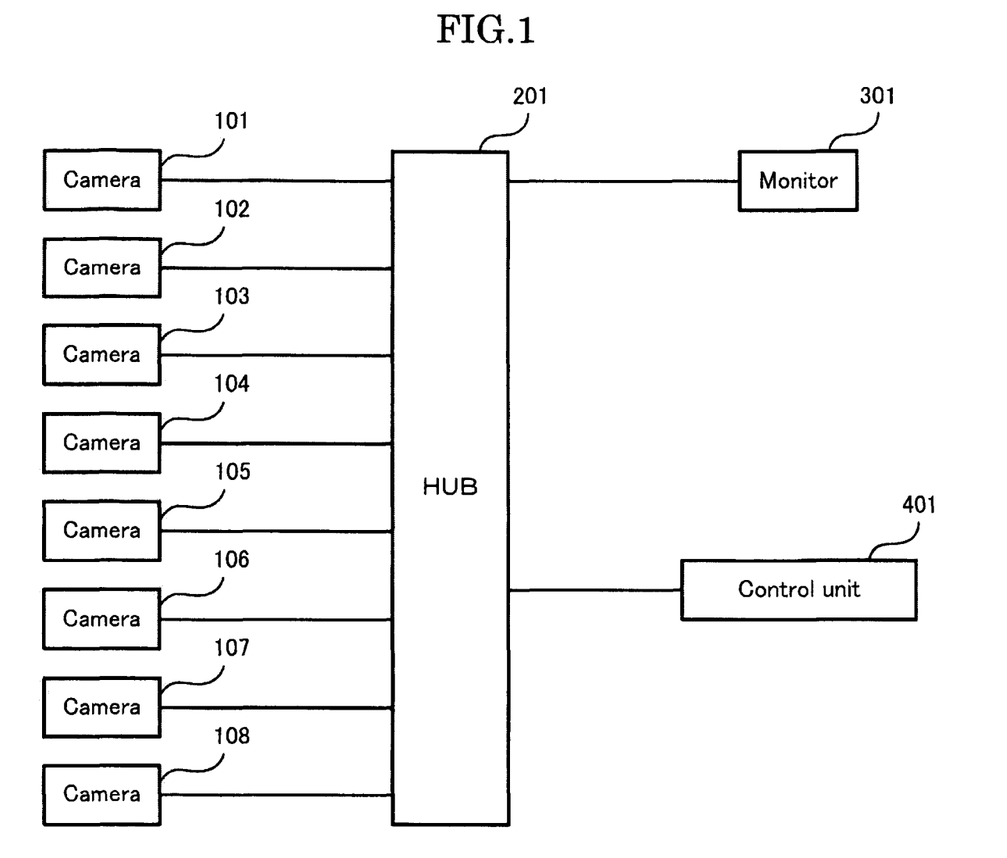
FIG. 1 is a schematic diagram showing an example of a configuration of the image display system according to one embodiment of the present invention.

FIG. 1 schematically shows an example of a configuration of the image display system according to one embodiment of the present invention. The image display system according to the present embodiment has cameras 101 through 108, a switching hub (HUB) 201, a monitor 301 and a control unit 401. The cameras 101 through 108, the monitor 301 and the control unit 401 are connected to each other via the switching hub 201 in a communicable manner.

Though in FIG. 1 one switching hub 201 is connected to the respective devices (101 through 108, 301 and 401), for the purpose of convenience, the figure is simplified. In reality, each car is generally provided with a switching hub. The switching hub in each car is connected to the switching hubs of the adjacent cars through a network cable. Thus, a network within a train is formed by connecting the switching hubs mounted in the adjacent cars.

The cameras 101 through 104 are provided in the first car that is on the front side of the train relative to the direction in which the train is traveling, whereas the cameras 105 through 108 are provided in the second car that is on the rear side relative to the direction in which the train is traveling. The cameras 101 and 105 are attached to the front portion of the car on the left side so as to be directed towards the rear side, cameras 102 and 106 are attached to the rear portion of the car on the left side so as to be directed towards the front side, cameras 103 and 107 are attached to the front portion of the car on the right side so as to be directed towards the rear side, and cameras 104 and 108 are attached to the rear portion of the car on the right side so as to be directed towards the front side.

Various types of cameras can be used as the cameras 101 through 108, and in the present embodiment, DOO (Driver Only Operation) cameras, which are a type of IP camera, are used. The DOO cameras are in a flat shape so as to reduce the resistance from the air and the collision of gravel, and have only one side for the attachment to the car. Therefore, in order to arrange two DOO cameras in such a manner that they are directed in different directions, one DOO camera needs to be attached to the car in a first position, and at the same time, the other DOO camera needs to be attached to the car in a second position which is rotated by 180 degrees from the first position. In this case, the images taken by the DOO camera in the second position are upside-down, and therefore, it becomes necessary to carry out an upward and downward inverting process before the images are displayed on the monitor. The upward and downward inverting process may be carried out in the DOO camera in the second position itself, or the monitor may specify the DOO camera in the second position so as to carry out the process on the images taken by the DOO camera in the second position.

The monitor 301 is installed within the cabin so that the trainman who drives the train can confirm the images of the platform on the spot. In the present embodiment, the monitor 301 is installed only in the first car with the cabin. In the case where another car has a cabin, however, a monitor may be installed in this car. In addition, in the present embodiment, one monitor 301 is connected to eight cameras 101 through 108; however, the number of cameras and the number of monitors are arbitrary.

The control unit 401 is a device that receives from the outside a traveling direction instruction for instructing the direction in which the train is to travel, and a door opening and closing instruction for instructing the opening and closing of the doors, and transfers the information to the respective cameras 101 through 108. The traveling direction instruction and the door opening and closing instruction are transmitted, for example, from a host system such as a TMS (Train Management System) for managing the operation of the train. In this embodiment, the control unit 401 is installed in the first car; however, another control unit 401 may be provided in another car as a substitute or as an addition.

Figure 2:
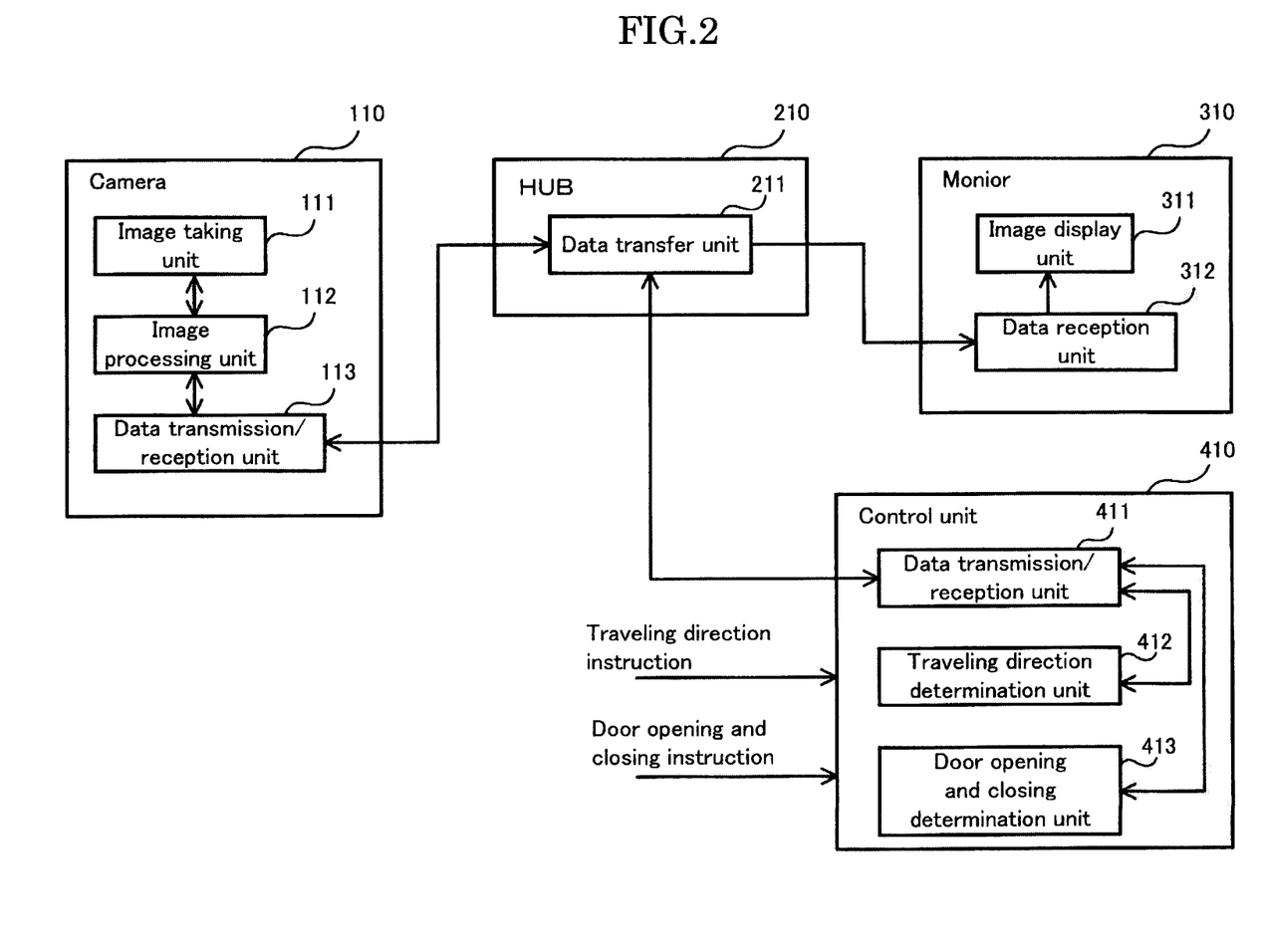
FIG. 2 is a diagram showing an example of a functional block concerning the image display system in FIG. 1.

FIG. 2 shows an example of a functional block concerning the video display system in FIG. 1. The camera 110, the switching hub (HUB) 210, the monitor 310 and the control unit 410 in FIG. 2 respectively correspond to the cameras 101 through 108, the switching hum 201, the monitor 301 and the control unit 401 in FIG. 1.

The camera 110 is provided with an image taking unit 111, an image processing unit 112, and a data transmission/reception unit 113. The switching hub 210 is provided with a data transfer unit 211. The monitor 310 is provided with an image display unit 311 and a data reception unit 312. The control unit 410 is provided with a data transmission/reception unit 411, a traveling direction determination unit 412 and a door opening and closing determination unit 413. Here, these functional units are merely an example and do not limit the functions of the respective devices. For example, it is also possible for the monitor 310 to be provided with an image processing unit 112 so that image processing can be carried out in the monitor 310.

In addition, the camera 110 allows data including the installation location information of the camera, the image taking direction information of the camera and the cutout region information to be stored in a memory. The installation location information is information that indicates to which location in the car the camera is attached. For example, a predetermined direction is used for a reference in order to set values that indicate whether the location is on the left side or the right side of the body of the car relative to this direction, and whether the location is on the front side or the rear side of the body of the car relative to this direction. The image taking direction information is information that indicates the direction in which images are taken by the camera, which differs in response to the direction in which the camera is attached to the body of the car. The cutout region information is information that indicates a region to be cut out from an image taken by the camera, and a number of different cutout regions are set so as to correspond to the opening and closing state of the doors.

When the traveling direction determination unit 412 receives a traveling direction instruction, the control unit 410 allows the data transmission/reception unit 411 to transmit the traveling direction information to the camera 110. When the door opening and closing determination unit 413 receives a door opening and closing instruction, the control unit 410 allows the data transmission/reception unit 411 to transmit the door opening and closing information to the camera 110. The control unit 410 allows the traveling direction information and the door opening and closing information to be respectively transmitted to the camera 110 via the data transfer unit 211 in the switching hub 210.

The camera 110 feeds the traveling direction information and the door opening and closing information that have been received by the data transmission/reception unit 113 to the image processing unit 112. The image processing unit 112 determines a necessary image process on the basis of the travel direction information and the door opening and closing information, and carries out necessary image processing on the images taken by the image taking unit 111. In addition, the camera 110 allows the data transmission/reception unit 113 to transmit the image data after being processed by the image processing unit 112 to the monitor 310. The image data from the camera 110 is transmitted to the monitor 310 via the data transfer unit 211 in the switching hub 210.

The monitor 310 feeds the image data that has been received by the data reception unit 312 to the image display unit 311. The image display unit 311 displays the fed image data on a screen.

Here, the image display system according to the present embodiment has such a configuration that images on which an imaging process has been carried out in response to the traveling direction information and the door opening and closing information are displayed on the monitor instead of displaying the images taken by the camera on the monitor as they are. This imaging processing includes a first image processing where a left-right inversion process is carried out on the images of which the left and right are opposite between the positional relationship of the car and the platform in the images and the positional relationship as viewed in the direction in which the train is to travel, among the images to be displayed on the monitor, and a second image processing where a cutout process is carried out on each image to be displayed on the monitor so that the cutout region differs in response to the opening and closing state of the doors. In the following, the first image processing and the second image processing are respectively described.

[First Image Processing]

FIG. 3 shows an example of a state where the train is stopped along a platform of a station. FIG. 3 shows a situation where there are passengers A through F on the platform on the left side relative to the direction in which the train is to travel, and a situation where there are passengers A' through F' on the platform on the right side relative to the direction in which the train is to travel. Though in many cases a platform is only on one side, the left side or the right side, relative to the direction in which the train is to travel, there are some cases where platforms are on both sides.

In the case where the train is stopped at a station where a platform is on the left side relative to the direction in which the train is to travel, the doors on the left side of the train are opened and closed, and therefore, the images taken by the cameras 101, 102, 105 and 106 on the left side of the train are displayed on the monitor 301. The cameras 102 and 106 for taking images as viewed from the rear portion of the car toward the front side take images where the positional relationship of the cars and the platform in the images are the same as the positional relationship as viewed in the direction in which the train is to travel. Conversely, the cameras 101 and 105 for taking images as viewed from the front portion of the car towards the rear side take images where the positional relationship of the cars and the platform in the images is opposite between left and right to the positional relationship as viewed in the direction in which the train is to travel. In this case, it is possible for the trainman to have an uncomfortable feeling if the images taken by the cameras 101 and 105 are displayed as they are. This is because the location of the body of the car in the images taken by the cameras 101 and 105 is opposite between the left and the right to that in the platform mirror 501 (see FIG. 3) installed on the platform on the left side and in front of the train. Therefore, a left-right inversion process is carried out on the images taken by the cameras 101 and 105.

In the case where the train is stopped at a station where there is a platform on the right side relative to the direction in which the train is to travel, the doors on the right side of the train are opened and closed, and therefore, images taken by the cameras 103, 104, 107 and 108 on the right side of the train are displayed on the monitor 301. In this case, the cameras 103 and 107 for taking images as viewed from the front portion of the car to the rear side provide images where the positional relationship of the cars and the platform in the images is opposite between the left and right to the positional relationship as viewed in the direction in which the train is to travel. Accordingly, it is possible for the trainman to have an uncomfortable feeling if the images taken by the cameras 103 and 107 are displayed as they are. This is because the location of the body of the car in the images taken by the cameras 103 and 107 is opposite between the left and the right to that in the platform mirror 502 (see FIG. 3) installed on the platform on the right side and in front of the train. Therefore, a left-right inversion process is carried out on the images taken by the cameras 103 and 107.

Figure 4A:
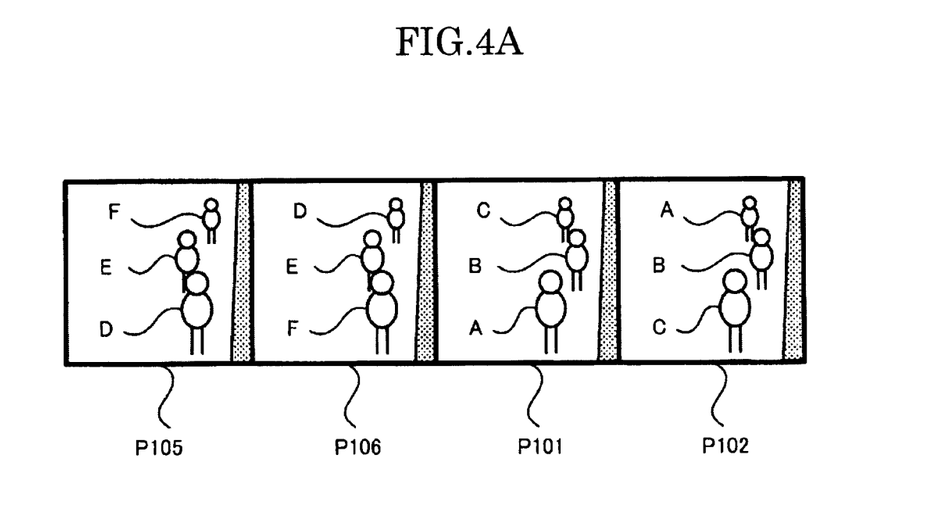
FIG. 4A is a diagram showing an example of a display of images taken by a camera attached to the left side of a train.
Figure 4B:
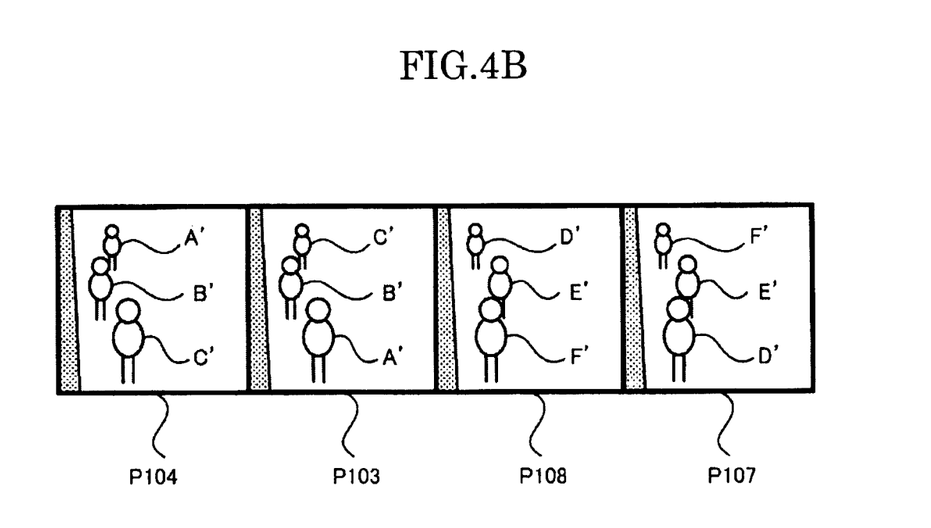
FIG. 4B is a diagram showing an example of a display of images taken by a camera attached to the right side of the train.

FIGS. 4A and 4B show an example of the results of carrying out the first image processing. In FIGS. 4A and 4B, images P101 through P108 respectively correspond to the cameras 101 through 108. FIG. 4A shows an example of the display of the images P101, P102, P105 and P106 taken by the respective cameras attached to the left side of the train. In any of these images, the train is displayed on the right side of the image in the same manner as in the case of being viewed through the platform mirror 501. FIG. 4B shows an example of the display of the images P103, P104, P107 and P108 taken by the respective cameras attached to the right side of the train. In any of these images, the train is displayed on the left side of the image in the same manner as in the case of being viewed through the platform mirror 502. Thus, the trainman can confirm the situation of the platform with the same feeling as the conventional manner, and therefore can efficiently check the passengers getting on and off the train.

The camera images on which a left-right inversion process is to be carried out can be determined on the basis of the direction in which the images are taken by the camera and the direction in which the train is to travel. That is to say, the left-right inversion process may not be carried out on the camera images where the direction in which the image is taken and the direction in which the train is to travel are the same, but the left-right inversion process may be carried out on the camera images where the direction in which the images are taken and the direction in which the train is to travel are not the same. The present embodiment provides a configuration where the respective cameras 101 through 108 determine the necessity of the left-right inversion on the basis of the image taking direction information within the memory and the traveling direction information from the control unit 401 so as to carry out a left-right inversion process in the case where it is determined that the left-right inversion is necessary.

Here, the configuration is not limited to that in the above description where the first image processing is carried out by the cameras 101 through 108 respectively, and the process may be carried out by the monitor 301. In this case, the monitor 301 may have the image taking direction information for each camera. In addition, another device (control unit 410, for example) may carry out the first image processing. In this case, this device may have the image taking direction information for each camera, carry out a necessary image processing upon receiving the image data from the cameras 101 through 108, and transmit the image data after being processed to the monitor 301 for display.

Figure 5A:
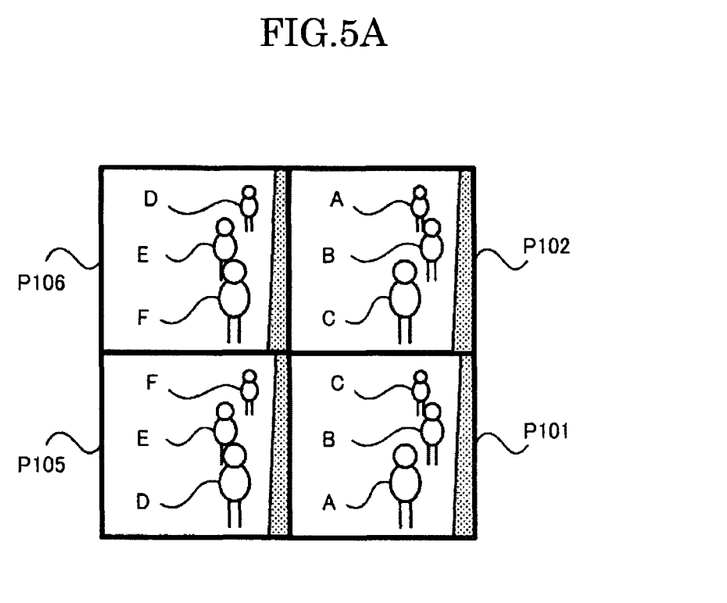
FIG. 5A is a diagram showing another example of a display of images taken by the camera attached to the left side of the train.
Figure 5B:
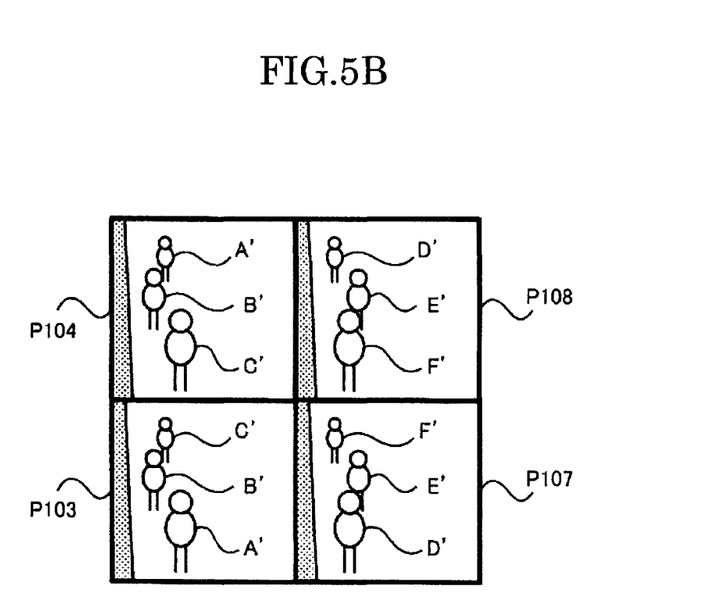
FIG. 5B is a diagram showing another example of a display of images taken by the camera attached to the right side of the train.

FIGS. 5A and 5B show another example of the results of carrying out the first image processing. FIG. 5A shows an example of the display of the images P101, P102, P105 and P106 taken by the respective cameras attached to the left side of the train. FIG. 5B shows an example of the display of the images P103, P104, P107 and P108 taken by the respective cameras attached to the right side of the train. In FIGS. 4A and 4B, a plurality of camera images are aligned from the left to the right in the order of the cars corresponding to the direction in which the train is to travel, and at the same time, the camera images from the same car are arranged so as to be adjacent from the left to the right. In contrast, in FIGS. 5A and 5B, a plurality of camera images is aligned from the left to the right in the order of the cars corresponding to the direction in which the train is to travel, and at the same time, the camera images from the same car are arranged so as to be adjacent from the top to the bottom. In either display example in FIGS. 4A and 4B or FIGS. 5A and 5B, the images taken by the cameras attached to the same side of the same car are displayed in a set, and therefore, it is possible for the trainman to easily specify from which car a concerned image is taken.

[Second Image Processing]

As described above, the main focus of the first image processing is to improve the ease of view as a whole when the trainman checks the camera images. In contrast, the second image processing focuses on the change of the place or the range to which the trainman should pay attention in response to the opening and closing state of the doors at the time of the stoppage of the train. FIG. 6 shows another example of the situation where the train is stopped along a platform of a station. FIG. 6 shows a situation where there are passengers T1 and T2 on the platform on the left side relative to the direction in which the train is to travel.

The place or the range to which the trainman should pay attention differs between the period immediately after the opening of the doors of the train, the period immediately after the closing of the doors of the train, and the period in-between.

Figure 7A:
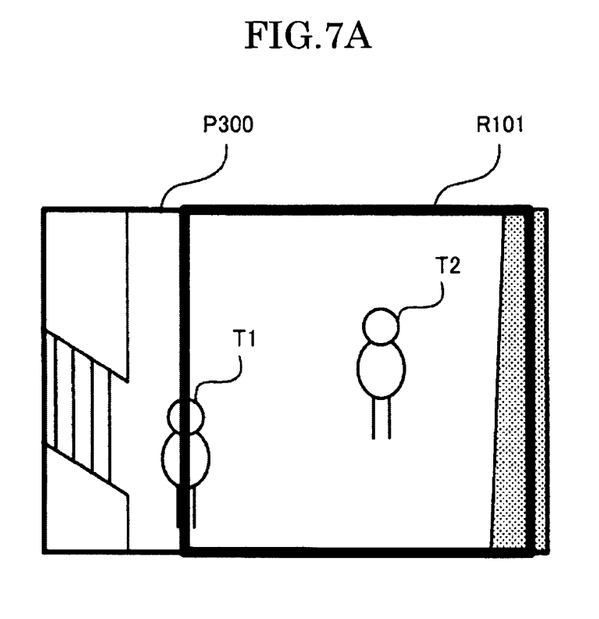
FIG. 7A is a diagram showing an example of a region to be cut out from an image taken by a camera during the first period at the time of the stoppage of the train.
Figure 7B:
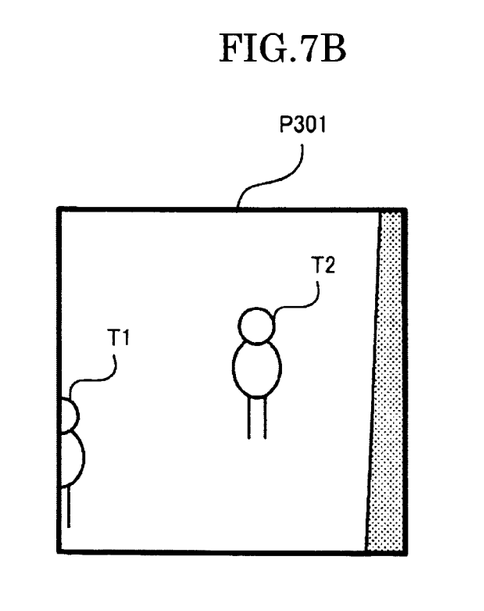
FIG. 7B is a diagram showing an example of a display during the first period at the time of the stoppage of the train.

During the first period, which is a predetermined period immediately after the opening of the doors of the train, it is necessary for the trainman to mainly check the passengers that have gotten off the train. Therefore, during the first period, the region shifted towards the car side is cut out from the original image taken by the camera. FIG. 7A shows an example of a region R101 that has been cut out from the original image P300 during the first period. FIG. 7B shows an example of the display of the cutout image P301. Here, it is preferable for a process to be carried out so that the image P301 is expanded or contracted in the left to right direction in order for the cutout image P301 to have the same width as the region allocated for each camera on the monitor. The above-described process makes it possible for the trainman to easily view the situation in the vicinity of the doors of the car, and thus, the trainman can efficiently confirm the passengers who have gotten off the train.

Figure 8A:
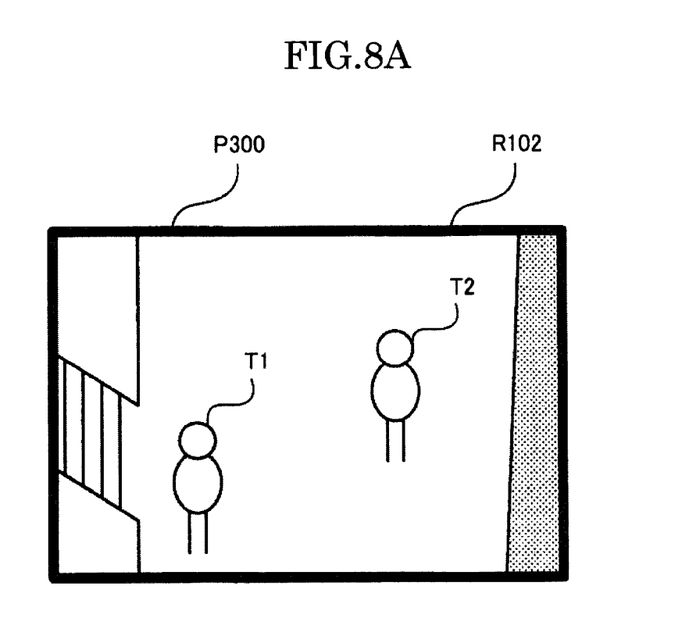
FIG. 8A is a diagram showing an example of a region to be cut out from an image taken by a camera during the second period at the time of the stoppage of the train.
Figure 8B:
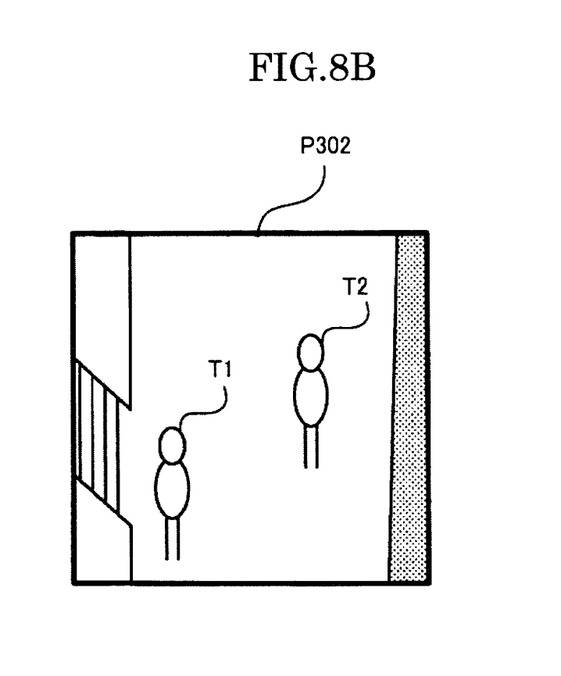
FIG. 8B is a diagram showing an example of a display during the second period at the time of the stoppage of the train.

During the second period, which is the period after the first period has elapsed (predetermined period immediately after the opening of the door) and before the closing of the door, it is necessary for the trainman to mainly check the passengers who are getting on the train. Therefore, during the second period, a region that covers the space on the opposite side of the car wider than the region cut out during the first period is cut out from the original image taken by the camera. FIG. 8A shows an example of the region R102 cut out from the original image P300 during the second period. FIG. 8B shows an example of the display of the cutout image P302. In addition, in the present embodiment, a process for contracting the image in the left to right direction has been carried out on the image P302 so that the cutout image P302 can be contained within the width of the region that is allocated for each camera on the monitor. The above-described process can allow the trainman to see the situation of the platform with a wider view, and thus confirm efficiently the passengers getting on the train.

Figure 9A:
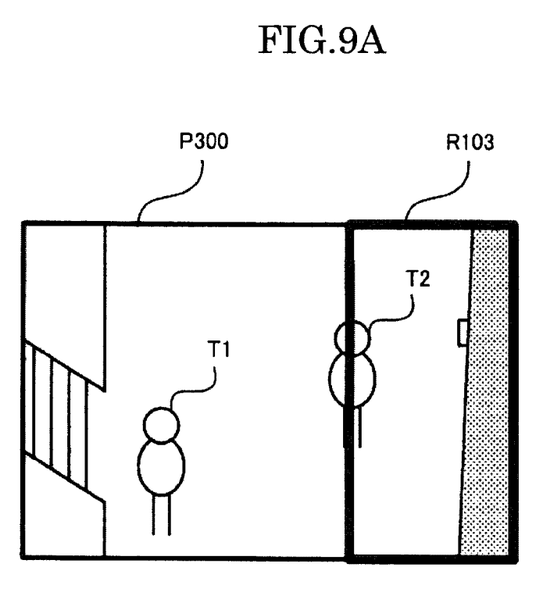
FIG. 9A is a diagram showing an example of a region to be cut out from an image taken by a camera during the third period at the time of the stoppage of the train.
Figure 9B:
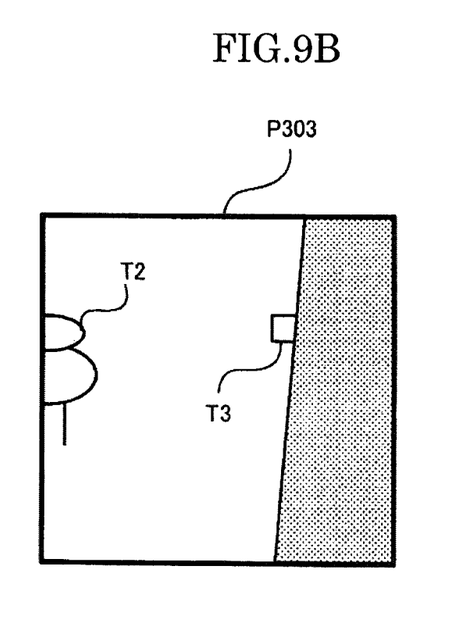
FIG. 9B is a diagram showing an example of a display during the third period at the time of the stoppage of the train.

During the third period that is a predetermined period immediately after the closing of the doors, it is necessary for the trainman to mainly check whether anything has been caught between the doors. Therefore, during the third period, a region is cut out that is shifted towards the car side and of which the amount of shift towards the car side is greater than that of the region cut out during the first period. FIG. 9A shows an example of the region R103 that is cut out from the original image P300 during the third period. FIG. 9B shows an example of the display of the cutout image P303. In addition, in the present embodiment, a process for expanding the image in the left to right direction has been carried out on the cutout image P303 so that no space is left between the regions allocated for the respective cameras on the monitor. The above-described process can allow the trainman to easily see the situation of the door portions in the cars and to efficiently confirm whether anything has been caught between the doors. Here, it can be understood from the example of the display in FIG. 9B that whether an object T3 has been caught between the doors can be confirmed more easily from this image than from the original image.

Here, the above description of the opening and closing states of the doors (first through third periods) is merely an example, and the opening and closing states of the doors may be categorized in more detail, and more of a variety of cutout regions may be set for each period. Though in the present embodiment the opening and closing state of the door is automatically determined on the basis of the door opening and closing information so as to determine which cutout region is to be applied, the trainman may determine the opening and closing state of the door and manually select which cutout region is to be applied. In addition, the system may allow the setting of the cutout region to be changed in accordance with the preference of the trainman. Furthermore, the image display system may receive an instruction from the train office so as to switch the cutout regions in the case where a passenger running up or down the stairs is detected through the processing of the images taken by a platform camera installed on the platform side, or in the case where a trainman shouts a warning about running is detected by the sound recognition system.

The present embodiment provides a configuration where the respective cameras 101 through 108 determine the cutout region in accordance with the opening and closing state of the doors on the basis of the cutout region information within the memory and the door opening and closing information from the control unit 401, and carry out the corresponding cutout process.

Here, this configuration does not limit the second image processing to such processing to be carried out by the respective cameras 101 through 108, and the monitor 301 may carry out the second image processing. In this case, the monitor 301 may have the cutout region information. Alternatively, another device (control unit 410, for example) may carry out the second image processing. In this case, this device may have the cutout region information and receive image data from the cameras 101 through 1089 so as to carry out a necessary image process, and thus transmit the image data after being processed to the monitor 301 for display.

Figure 10:
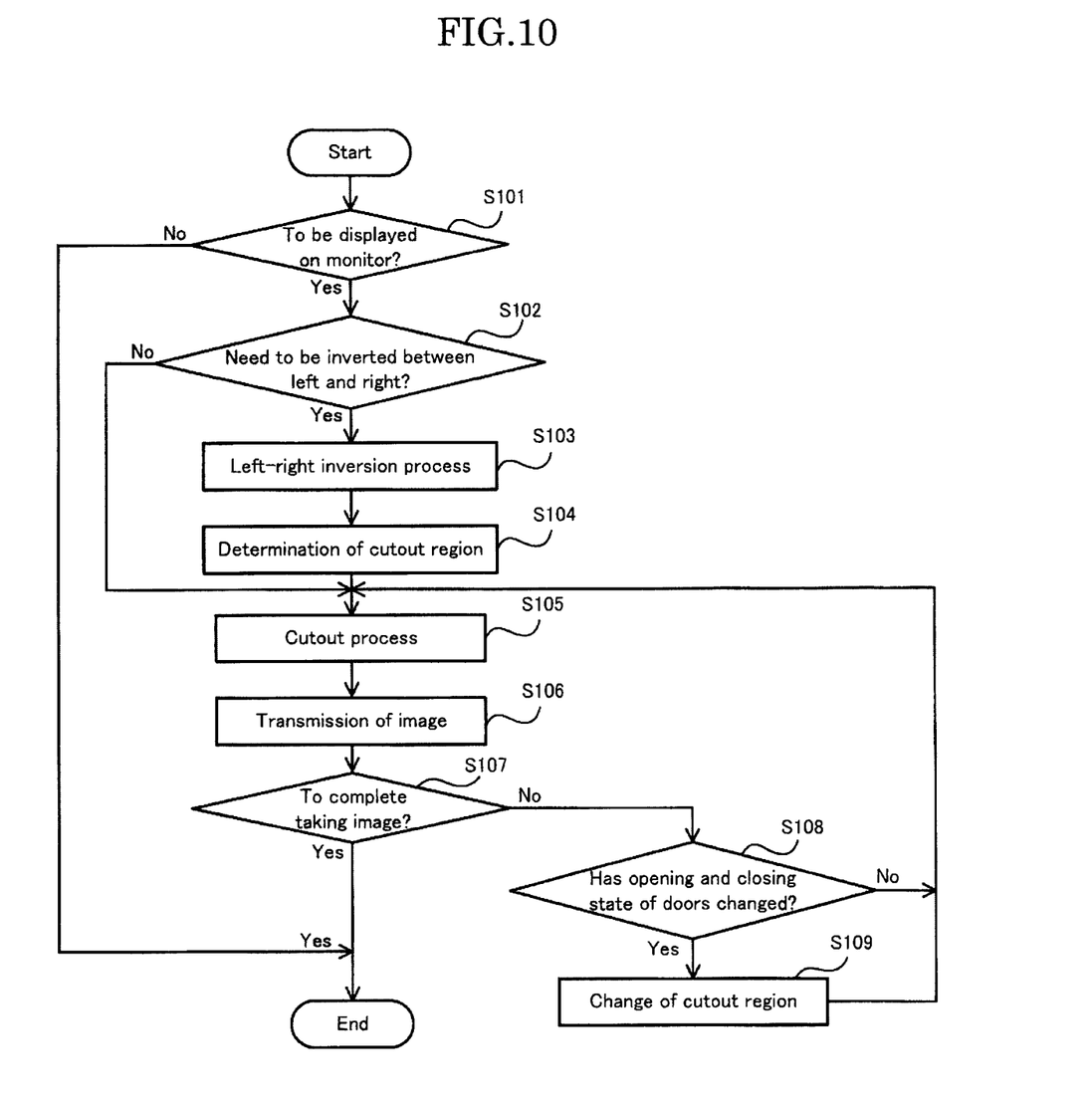
FIG. 10 is a flow chart showing an example of the process in the image display system in FIG. 1.

FIG. 10 shows an example of the process flow in the image display system according to the present embodiment. When the train arrives at a station and is stopped, the respective cameras 101 through 108 receive from the control unit 401 an instruction to start taking images and carry out the following processes.

First, it is determined whether or not the camera is a target camera of which the images are to be displayed on the monitor (step S101). In the present embodiment, a camera is determined to be a target camera of which the images are to be displayed on the monitor in the case where the camera is installed on the side where the doors open on the basis of the installation location information within the memory of the camera and the door opening and closing information from the control unit 401.

The process is completed in the case where it is determined in step S101 that the camera is not a target camera of which the images are to be displayed on the monitor. Meanwhile, it is determined next whether or not it is necessary to invert the image between left and right in the case where it has been determined that the camera is a target camera of which the images are to be displayed on the monitor (step S102). In the present embodiment, it is determined that it is necessary to invert the image between the left and the right in the case where the direction in which the image is taken by the camera is opposite to the direction in which the train is to travel on the basis of the image taking direction information within the memory of the camera and the traveling direction information from the control unit 401.

A left-right inversion process is carried out on the image that has been taken in the case where it has been determined in step S102 that it is necessary to invert the image between the left and the right (step S103). Meanwhile, a left-right inversion process is not carried out on the image that has been taken in the case where it has been determined that it is not necessary to invert the image between left and right.

Next, a region to be cut out from the image is determined (step S104). In the present embodiment, a cut out region that corresponds to the current opening and closing state of the doors is selected on the basis of the cutout region information within the memory of the camera and the door opening and closing information from the control unit 401.

Next, a cutout process is carried out on the image that has been taken (image that has been inverted between left and right if necessary) (step S105), and the cutout image is transmitted to the monitor 301 (step S106).

After that, it is determined whether or not taking images has been completed (step S107). In the present embodiment, it is determined that taking images has been completed in the case where an instruction to finish taking images is received from the control unit 401.

It is determined whether or not the opening and closing state of the doors has changed in the case where it has been determined in step S107 that image taking has not been completed (step S108). In the present embodiment, the change in the opening and closing state of the doors is detected on the basis of the door opening and closing information from the control unit 401.

The cutout region is changed to the one that corresponds to the opening and closing state after the change, and the procedure returns to step S105 in the case where it has been determined in step S108 that the opening and closing state of the doors has changed (step S109). Meanwhile, the procedure returns to step S105 without changing the cutout region in the case where it has been determined that the opening and closing state of the doors has not changed.

The above-described processes are repeated until it is determined that taking images is to be completed in step S107.

Here, the above-described process flow is merely an example, and a certain process may be replaced with another process, another process may be added, or the procedure of the processes may be changed. Though the above-described process flow is assumed to be carried out in the image processing unit in the cameras 101 through 108, the monitor 301, the control unit 401 or any other device may be provided with an image processing unit that is formed so as to gain the same results. An example of the image processing unit is implemented with a dedicated hardware circuit. Another example of the image processing unit is implemented by allowing a computer to run a predetermined program. That is to say, the predetermined program is stored in a data storage device such as a hard disk or a flash memory and is read out to a memory so as to be run by a processor in order to implement the image processing unit.

As described above, the image display system according to the present embodiment has such a configuration that a predetermined image processing is carried out on the images that have been taken by the cameras 101 through 108 attached to a side of the cars that form a train before the images are displayed on the monitor 301 that is mounted in the train.

That is to say, as a first image processing, among the images to be displayed, a left-right inversion process is carried out on the images where the positional relationship between the cars and the platform in the image is opposite between left and right to the positional relationship as viewed in the direction in which the train is to travel. As a result, the trainman can confirm the state on the platform with the same feeling at the time of confirmation using a platform mirror, and therefore can efficiently check the passengers getting on and off the train.

In addition, as a second image processing, a cutout process is carried out on the images to be displayed so that the cutout regions differ in accordance with the opening and closing state of the doors. As a result, the trainman can efficiently check the various items to be confirmed that differ in accordance with the opening and closing state of the doors. Consequently, it becomes possible to prevent a passenger who is rushing to board the train or an object caught between the closed doors from being unnoticed, for example.

Here, the configurations of the system and the devices in the present invention are not necessarily limited to the ones described in the above, and various configurations may be used.

It is also possible for the present invention to provide a method or a system for implementing the processes according to the present invention, a program for implementing such a method or system, or a storage medium for storing such a program.

INDUSTRIAL APPLICABILITY

The present invention can be applied to an image display system of various types for displaying images that have been taken by the cameras attached to a side of the cars of a train.

REFERENCE SIGNS LIST 101 through 108 and 110: camera
111: image display unit
112: image processing unit
113: data transmission/reception unit
201 and 210: switching hub
211: data transfer unit
301 and 310: monitor
311: image display unit
312: data reception unit
401 and 410: control unit
411: data transmission/reception unit
412: traveling direction determination unit
413: door opening and closing determination unit
501 and 502: platform mirror

The invention claimed is:

1. An image display system that is mounted in a train formed of a plurality of connected cars, the system comprising:
   a camera attached to a side of each car;
   a monitor for displaying an image that has been taken by the camera; and
   an image processing unit for processing an image to be displayed on the monitor, wherein the image processing unit:
      among the images to be displayed on the monitor, carries out a left-right inversion process on the image where the positional relationship between the car and the platform in the image is opposite between the left and the right to the positional relationship as viewed in the direction in which the train is to travel, and
      determines the images on which the left-right inversion process is to be carried out on the basis of the information that indicates the direction in which the train is to travel and the information that indicates the direction in which the image is taken by the camera.

2. The image display system according to claim 1 wherein a plurality of cameras is attached to the same side of the same car, and
the monitor displays the images taken by the plurality of cameras on the same side of the same car in such a manner that the images are adjacent upwards and downwards or left to right.

3. An image display method for displaying an image that has been taken by a camera attached to a side of a car that forms a train on a monitor mounted in the train, wherein
among the images to be displayed on the monitor, a left-right inversion process is carried out on the image where the positional relationship between the car and the platform is opposite between the left and the right in the image to the positional relationship as viewed in the direction in which the train is to travel, and
the image after the left-right inversion process has been carried out thereon is displayed on the monitor, and
determining the images on which the left-right inversion process is to be carried out on the basis of the information that indicates the direction in which the train is to travel and the information that indicates the direction in which the image is taken by the camera.

* * * * *